(12) United States Patent
Yamazaki et al.

(10) Patent No.: US 11,094,082 B2
(45) Date of Patent: Aug. 17, 2021

(54) INFORMATION PROCESSING APPARATUS, INFORMATION PROCESSING METHOD, ROBOT SYSTEM, AND NON-TRANSITORY COMPUTER-READABLE STORAGE MEDIUM

(71) Applicant: CANON KABUSHIKI KAISHA, Tokyo (JP)

(72) Inventors: Fukashi Yamazaki, Kawasaki (JP); Daisuke Kotake, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 16/535,469

(22) Filed: Aug. 8, 2019

(65) Prior Publication Data

US 2020/0051278 A1 Feb. 13, 2020

(30) Foreign Application Priority Data

Aug. 10, 2018 (JP) .............................. JP2018-151962

(51) Int. Cl.
*G06T 7/73* (2017.01)
*G06K 9/00* (2006.01)

(52) U.S. Cl.
CPC ............ *G06T 7/75* (2017.01); *G06K 9/00664* (2013.01); *G06T 7/74* (2017.01)

(58) Field of Classification Search
CPC ......... G06T 7/75; G06T 7/74; G06K 9/00664; G06K 9/00201
See application file for complete search history.

(56) References Cited

U.S. PATENT DOCUMENTS

| 9,002,098 B1* | 4/2015 | Chelian ................ G06K 9/4642 382/153 |
| 10,059,002 B2 | 8/2018 | Miyatani et al. |
| 10,171,730 B2 | 1/2019 | Kobayashi et al. |
| 10,304,206 B2 | 5/2019 | Nakazato et al. |
| 2009/0022365 A1* | 1/2009 | Kotake .................... G06K 9/32 382/103 |
| 2017/0352256 A1* | 12/2017 | Miwa ..................... G08B 25/04 |

(Continued)

FOREIGN PATENT DOCUMENTS

| JP | 5716433 B | 5/2015 |
| JP | 2015194478 A | 11/2015 |

OTHER PUBLICATIONS

Visual Face Tracking: a Coarse-to-Fine Target State Estimation (Year: 2013).*

(Continued)

*Primary Examiner* — Nizar N Sivji
(74) *Attorney, Agent, or Firm* — Carter, Deluca & Farrell LLP

(57) ABSTRACT

A plurality of verification position/orientation candidates for a target object is set. A common structure model including a geometric feature of a part, among geometric features of a reference model representing a three-dimensional shape of the target object, that is common among the candidates is generated. An image including the target object is obtained. A position/orientation of the target object is estimated by verifying the common structure model and the reference model arranged at the plurality of verification position/orientation candidates, against the image.

13 Claims, 10 Drawing Sheets

(56) References Cited

U.S. PATENT DOCUMENTS

2019/0130216 A1    5/2019   Tomioka et al.
2020/0012877 A1    1/2020   Kotake et al.

OTHER PUBLICATIONS

Real-Time Visual Tracking of Complex Structures (Year: 2002).*
Detection and Pose Estimation of Piled Objects Using Ensemble of Tree Classifiers (Year: 2012).*
Z. Zhang, "A Flexible New Technique for Camera Calibration," IEEE Transactions on Pattern Analysis and Machine Intelligence, vol. 22, No. 11, pp. 1330-1334, 2000.
P. J. Besl and N. D. McKay, "A Method for Registration of 3-D Shapes," IEEE Transactions on Pattern Analysis and Machine Intelligence, vol. 14, No. 2, pp. 239-256, 1992.
J. Canny, "A Computational Approach to Edge Detection," IEEE Transaction Pattern Analysis and Machine Intelligence, vol. 8, No. 6, pp. 679-698, 1986.
R. Horaud and F. Dornaika, "Hand-Eye Calibration," International Journal of Robotics Research, vol. 14, No. 3, pp. 195-210, 1995.

\* cited by examiner

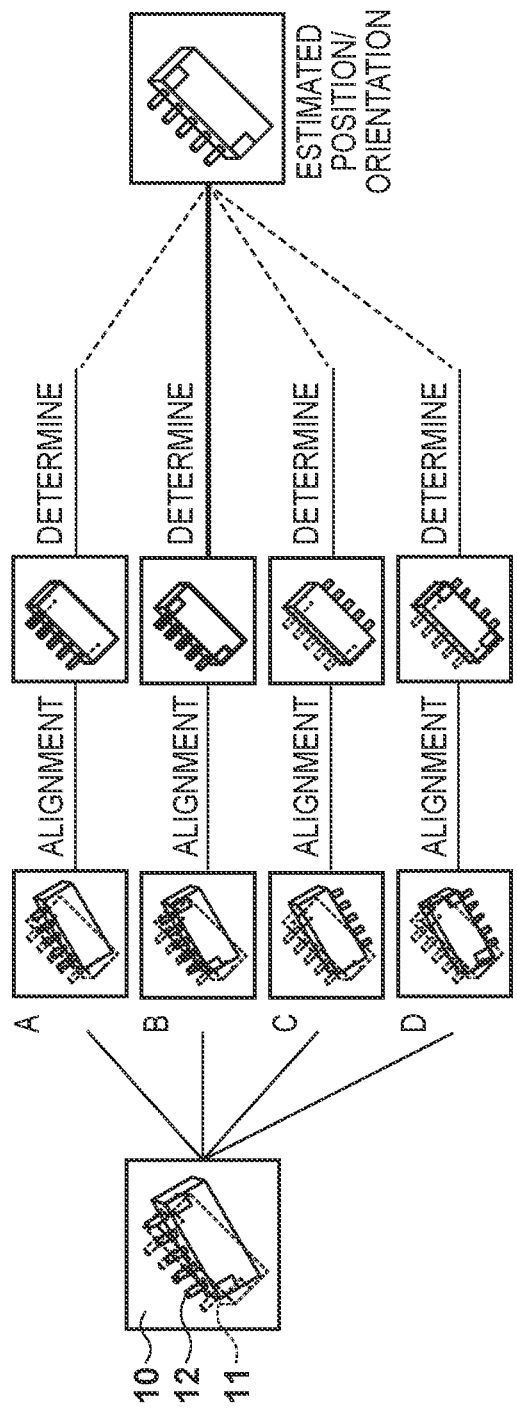
F I G. 1A
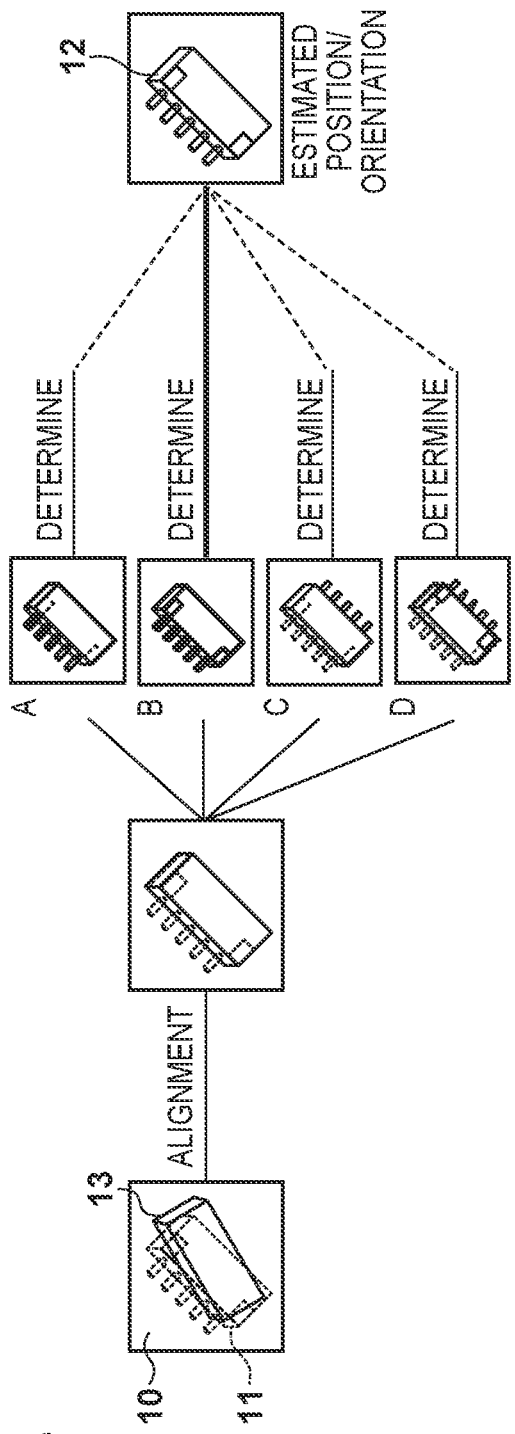
F I G. 1B

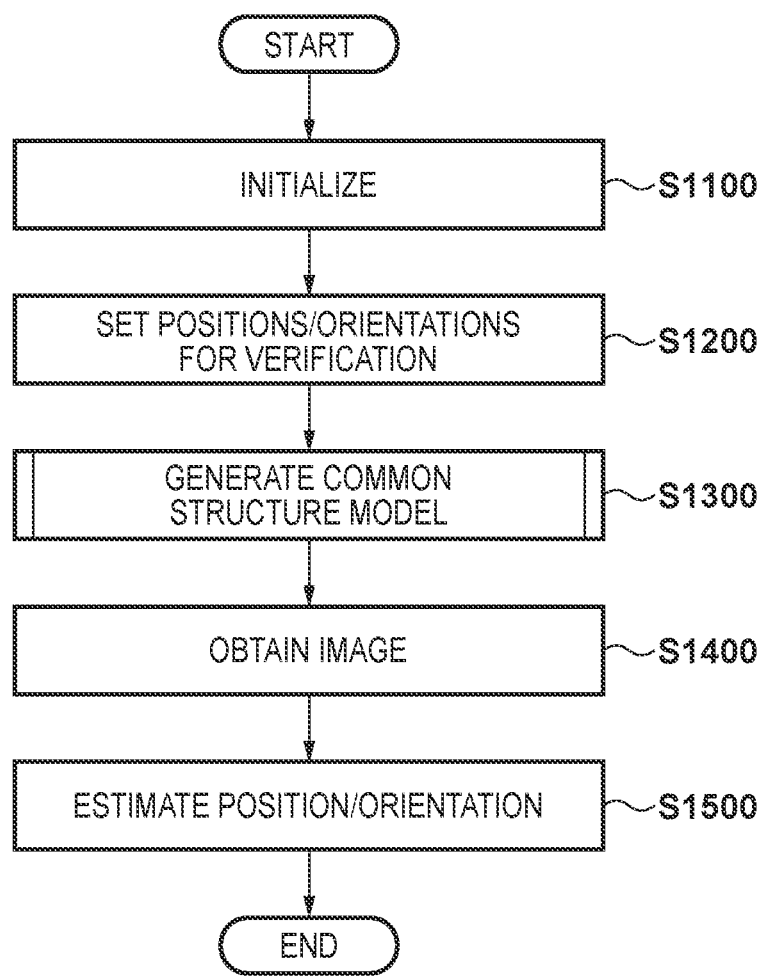

FIG. 4A
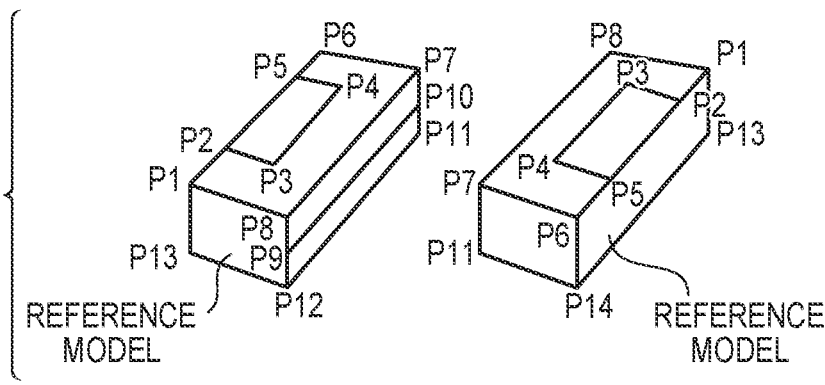
FIG. 4B
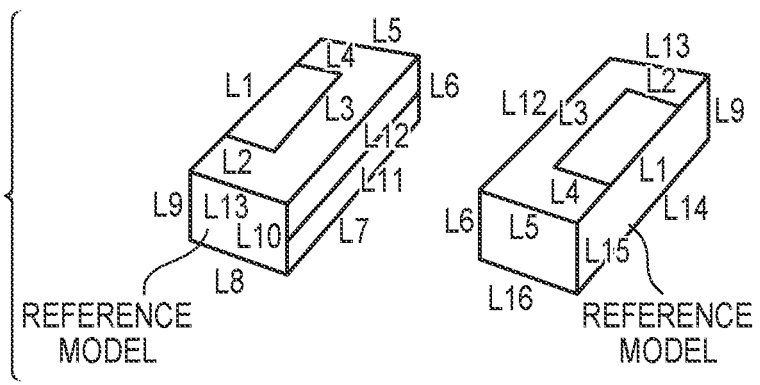
FIG. 4C
| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |
FIG. 4D
| LINE | 2 POINTS AT ENDS | IDENTIFIER |
|---|---|---|
| L1 | P1-P6 | True |
| L2 | P2-P3 | False |
| L3 | P3-P4 | False |
| L4 | P4-P5 | False |
| L5 | P6-P7 | True |
| L6 | P7-P11 | True |
| L7 | P11-P12 | True |
| L8 | P12-P13 | True |
| L9 | P1-P13 | True |
| L10 | P8-P12 | True |
| L11 | P9-P10 | False |
| L12 | P7-P8 | True |
| L13 | P1-P8 | True |
| L14 | P13-P14 | True |
| L15 | P6-P14 | True |
| L16 | P11-P14 | True |

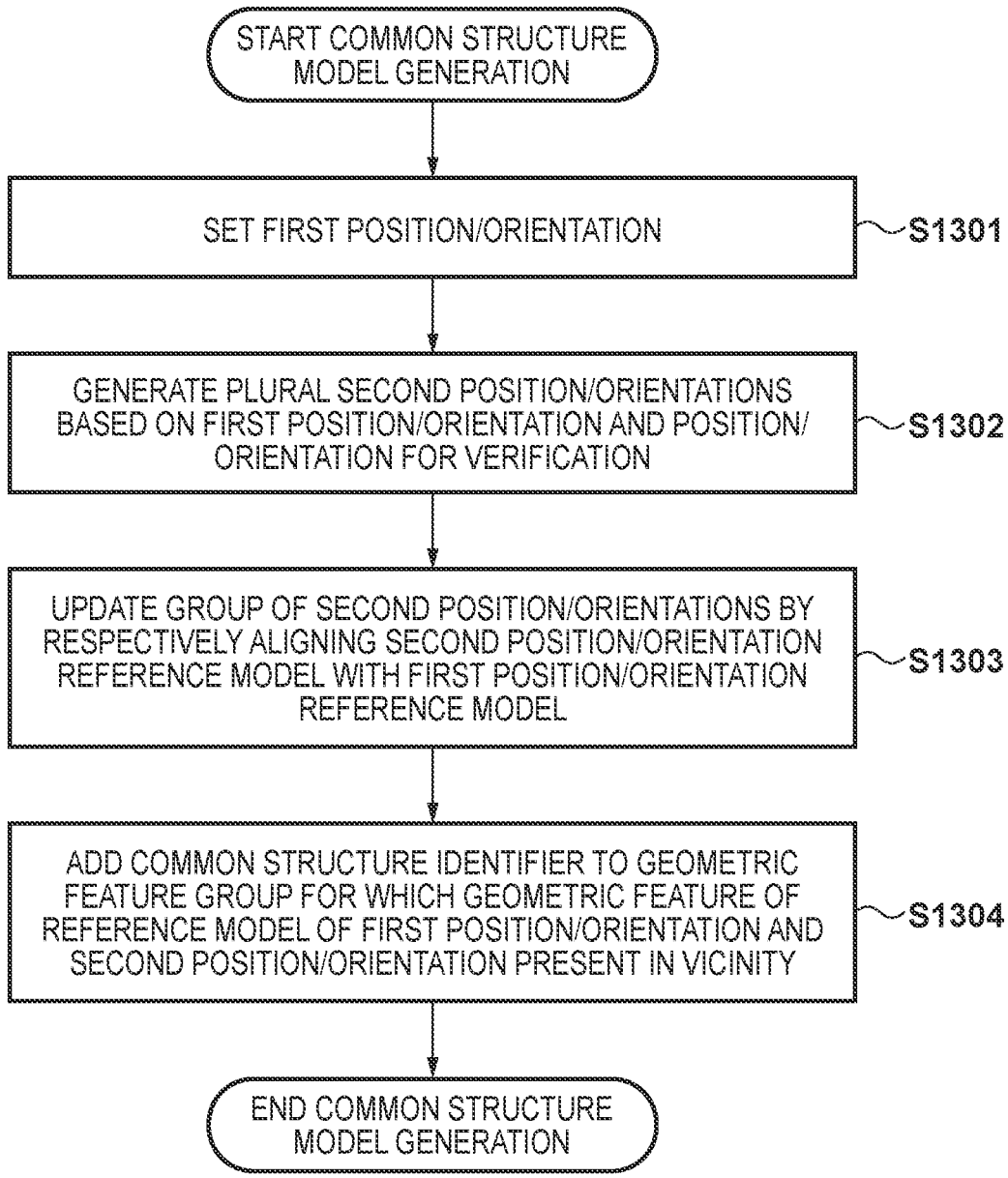

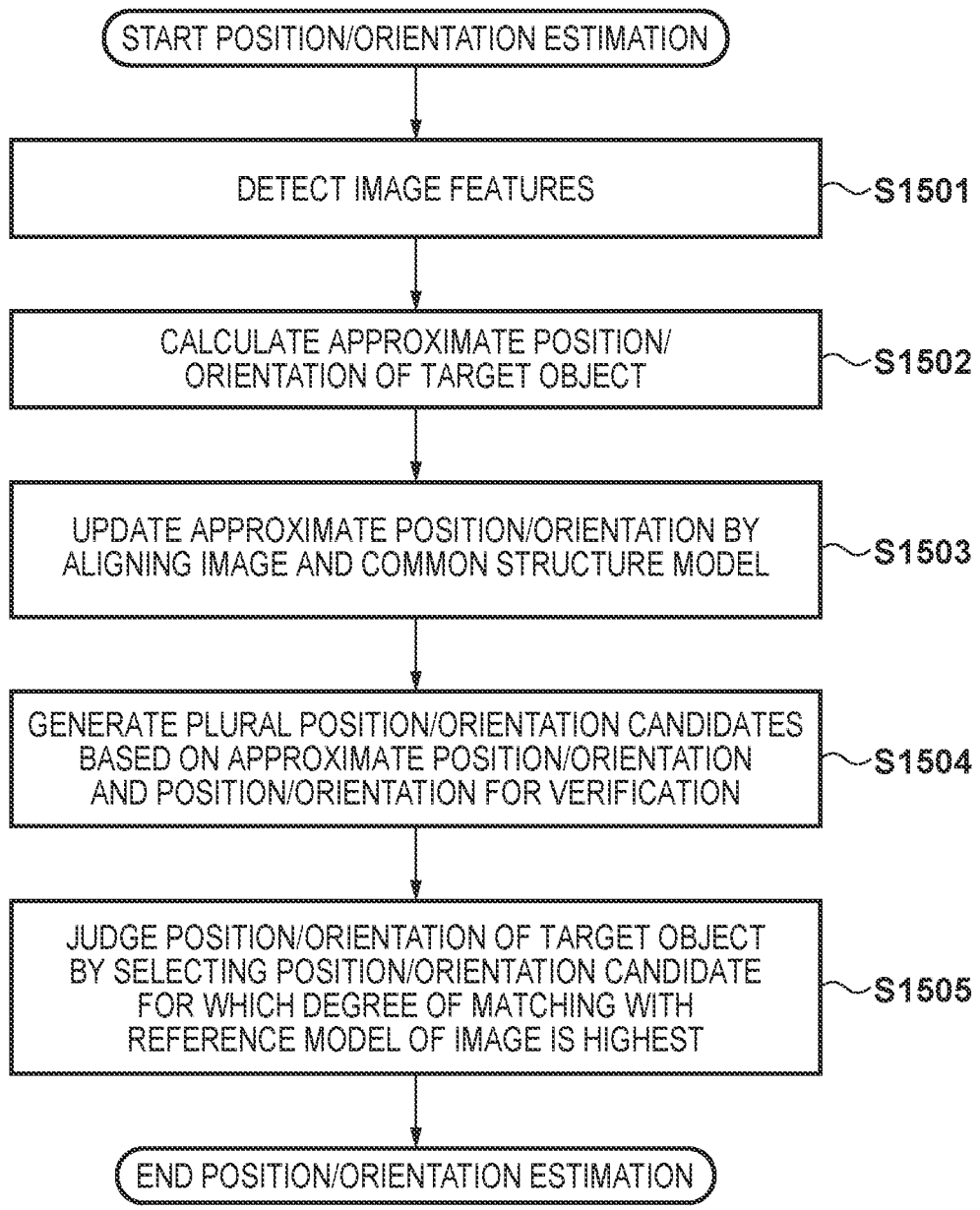

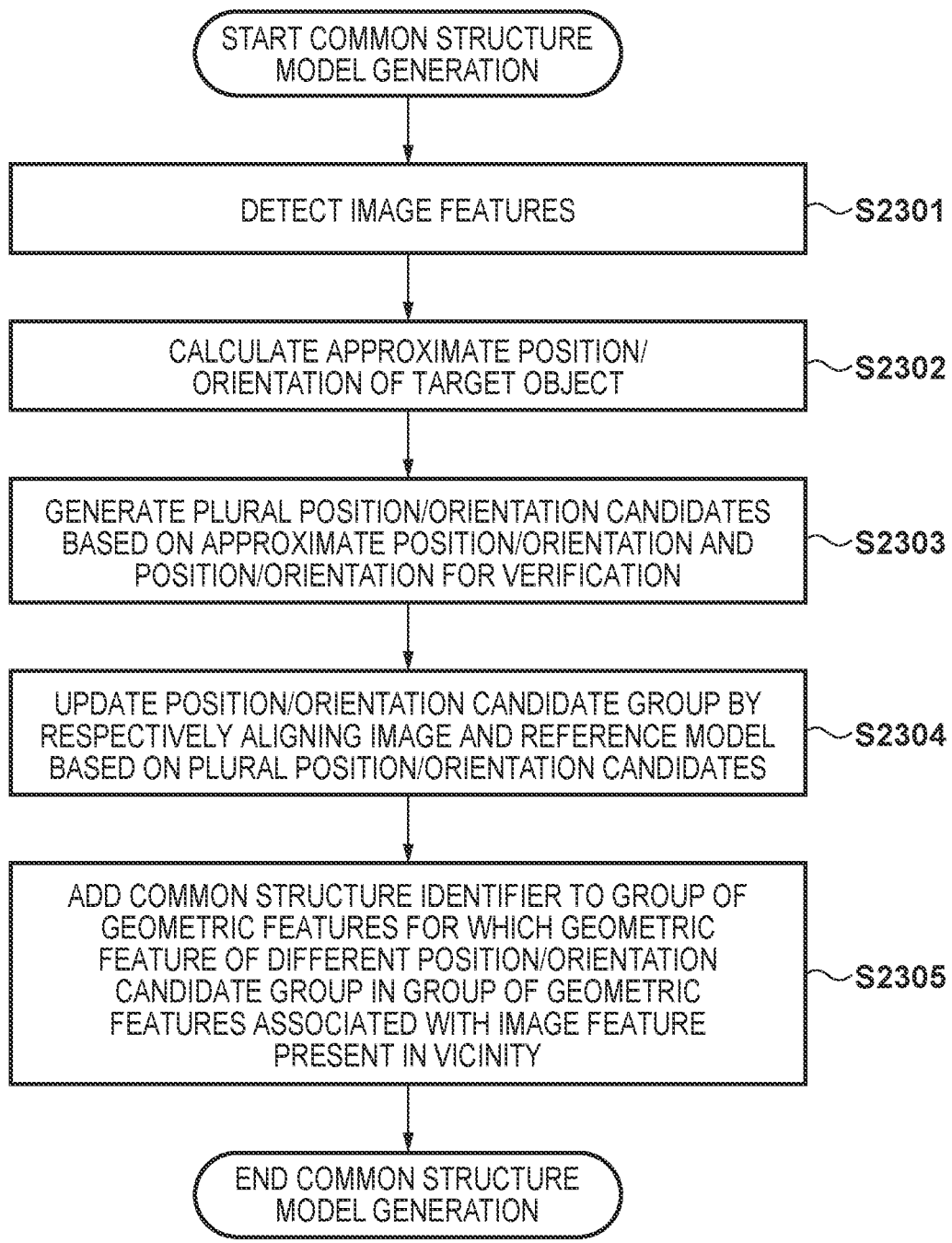

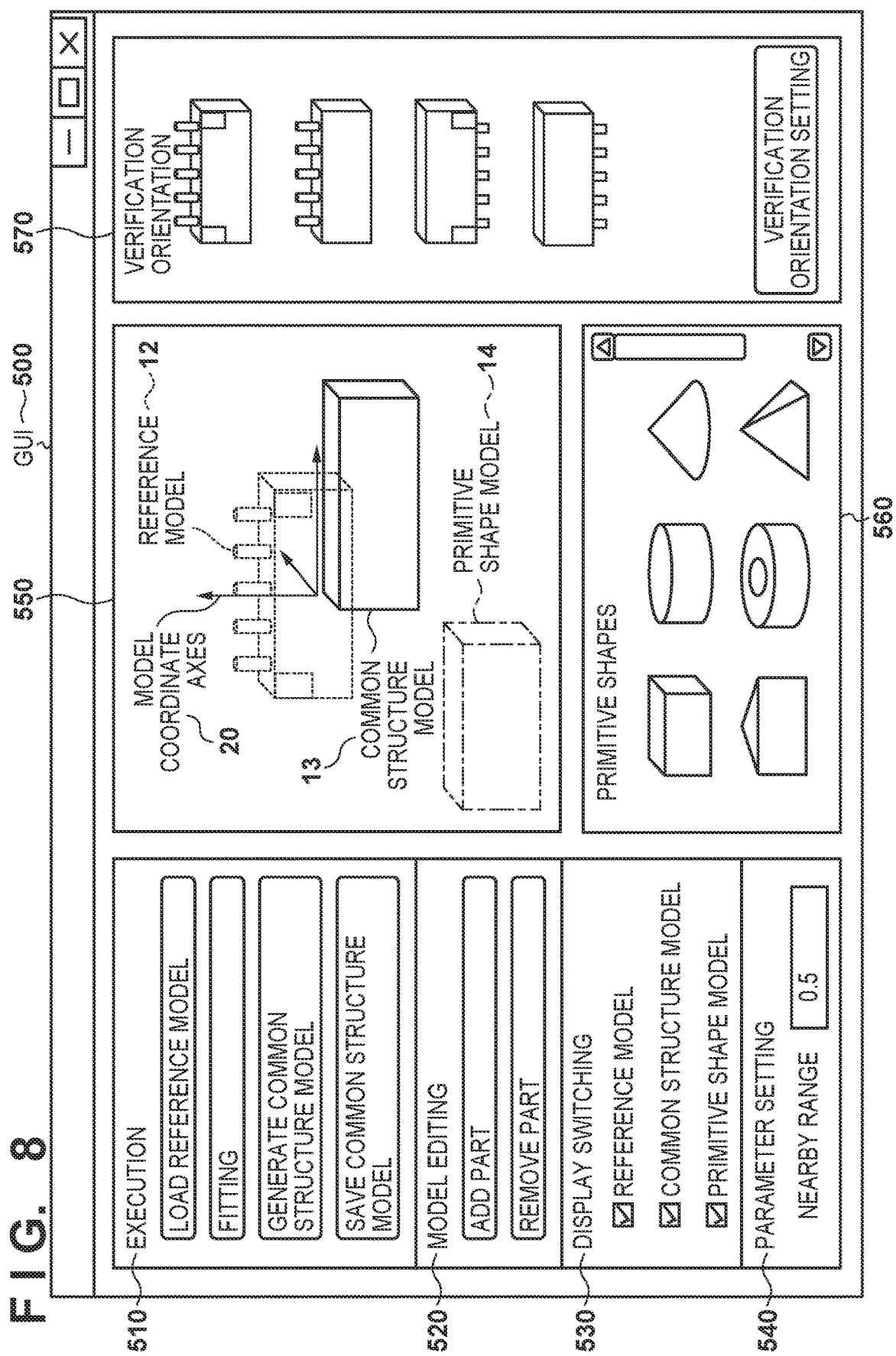

INFORMATION PROCESSING APPARATUS, INFORMATION PROCESSING METHOD, ROBOT SYSTEM, AND NON-TRANSITORY COMPUTER-READABLE STORAGE MEDIUM

BACKGROUND OF THE INVENTION

Field of the Invention

The present invention relates to a technique for estimating the position/orientation of a target object.

Description of the Related Art

With the recent advancements in robot technology, robots are beginning to handle complex tasks, such as assembling industrial products, that until now have been handled by humans. Such robots assemble products by gripping components using end effectors such as hands. For a robot to grip components, attach components to each other, and so on when assembling industrial products, the position/orientation of each component relative to the robot must be measured with a high level of accuracy. Model fitting, in which the position/orientation of a component is calculated so that a three-dimensional shape model representing the overall shape of a component fits with a grayscale image or range image obtained from a camera, a range sensor, or the like, is a typical method for measuring the position/orientation of a component with a high level of accuracy. In model fitting, image features detected in the grayscale image or three-dimensional coordinate points obtained from the range image are associated with geometric features of the three-dimensional shape model representing the overall shape of the component, and a position/orientation at which the sum of residual errors at those associations is minimum is calculated. To calculate the position/orientation, this method requires, as an initial value, the approximate value of the position/orientation of the component recognized from the image. However, model fitting calculates a position/orientation which is dependent on the provided initial value, and thus if the initial value differs from the position/orientation of the target object, problems will arise in the local minima and the position/orientation estimation will have error. For example, if the front and rear of a component have similar shapes, the position/orientation of the rear surface of the component may be provided as the initial value despite it being the front surface of the component that is being observed. In such a case, model fitting will converge on a wrong solution, making it impossible to calculate the correct position/orientation.

In response to this problem, the methods disclosed in Japanese Patent No. 5716433 and Japanese Patent Laid-Open No. 2015-194478 propose generating, on the basis of a plurality of positions/orientations at which similar shapes are observed, position/orientation candidates that serve as the initial value for model fitting, and then carrying out alignment with each of the candidates. The position/orientation at which the image and the three-dimensional shape model representing the overall shape of the component match to the highest degree is selected from among the post-alignment position/orientation candidates.

However, the methods disclosed in Japanese Patent No. 5716433 and Japanese Patent Laid-Open No. 2015-194478 are problematic in that a plurality of position/orientation candidates that serve as the initial value for model fitting are generated, and the alignment process is carried out for each candidate, resulting in a high processing cost.

SUMMARY OF THE INVENTION

The present invention provides a technique for reducing the processing cost of estimating the position/orientation of a target object having a position/orientation in which a similar shape is observed.

According to the first aspect of the present invention, there is provided an information processing apparatus comprising: a setting unit configured to set a plurality of verification position/orientation candidates for a target object; a generating unit configured to generate a common structure model including a geometric feature of a part, among geometric features of a reference model representing a three-dimensional shape of the target object, that is common among the candidates; an obtaining unit configured to obtain an image including the target object; and an estimating unit configured to estimate a position/orientation of the target object by verifying the common structure model and the reference model arranged at the plurality of verification position/orientation candidates, against the image.

According to the second aspect of the present invention, there is provided an information processing apparatus comprising: a setting unit configured to set a plurality of verification position/orientation candidates for a target object; a model obtaining unit configured to obtain a common structure model including a geometric feature of a part, among geometric features of a reference model representing a three-dimensional shape of the target object, that is common among the candidates; an image obtaining unit configured to obtain an image including the target object; and an estimating unit configured estimate a position/orientation of the target object by verifying the common structure model, and the reference model arranged at the plurality of verification position/orientation candidates, against the image.

According to the third aspect of the present invention, there is provided an information processing method carried out by an information processing apparatus, the method comprising: setting a plurality of verification position/orientation candidates for a target object; generating a common structure model including a geometric feature of a part, among geometric features of a reference model representing a three-dimensional shape of the target object, that is common among the candidates; obtaining an image including the target object; and estimating a position/orientation of the target object by verifying the common structure model, and the reference model arranged at the plurality of verification position/orientation candidates, against the image.

According to the fourth aspect of the present invention, there is provided an information processing method carried out by an information processing apparatus, the method comprising: setting a plurality of verification position/orientation candidates for a target object; obtaining a common structure model including a geometric feature of a part, among geometric features of a reference model representing a three-dimensional shape of the target object, that is common among the candidates; obtaining an image including the target object; and estimating a position/orientation of the target object by verifying the common structure model, and the reference model arranged at the plurality of verification position/orientation candidates, against the image.

According to the fifth aspect of the present invention, there is provided a robot system comprising: an image capturing apparatus that captures an image; an information processing apparatus including: a setting unit configured to set a plurality of verification position/orientation candidates for a target object; a generating unit configured to generate a common structure model including a geometric feature of a part, among geometric features of a reference model representing a three-dimensional shape of the target object, that is common among the candidates; an obtaining unit configured to obtain an image including the target object; and an estimating unit configured to estimate a position/orientation of the target object by verifying the common structure model and the reference model arranged at the plurality of verification position/orientation candidates, against the image; and a robot that grips the target object on the basis of an estimation result of the position/orientation of the target object obtained by the information processing apparatus.

According to the sixth aspect of the present invention, there is provided a non-transitory computer-readable storage medium storing a computer program for causing a computer to function as: a setting unit configured to set a plurality of verification position/orientation candidates for a target object; a generating unit configured to generate a common structure model including a geometric feature of a part, among geometric features of a reference model representing a three-dimensional shape of the target object, that is common among the candidates; an obtaining unit configured to obtain an image including the target object; and an estimating unit configured to estimate a position/orientation of the target object by verifying the common structure model and the reference model arranged at the plurality of verification position/orientation candidates, against the image.

Further features of the present invention will become apparent from the following description of exemplary embodiments (with reference to the attached drawings).

BRIEF DESCRIPTION OF THE DRAWINGS

FIGS. 1A and 1B are diagrams illustrating an overview of an embodiment.

FIG. 3 is a flowchart illustrating processing carried out to estimate the position/orientation of a target object.

FIGS. 4A to 4D are schematic diagrams illustrating the data structure of a reference model.

FIG. 5 is a flowchart illustrating details of the process of step S1300.

FIG. 6 is a flowchart illustrating details of the process of step S1500.

FIG. 7 is a flowchart illustrating a process for generating a common structure model.

FIG. 8 is a diagram illustrating an example of a GUI for generating a common structure model.

DESCRIPTION OF THE EMBODIMENTS

Figure 2:
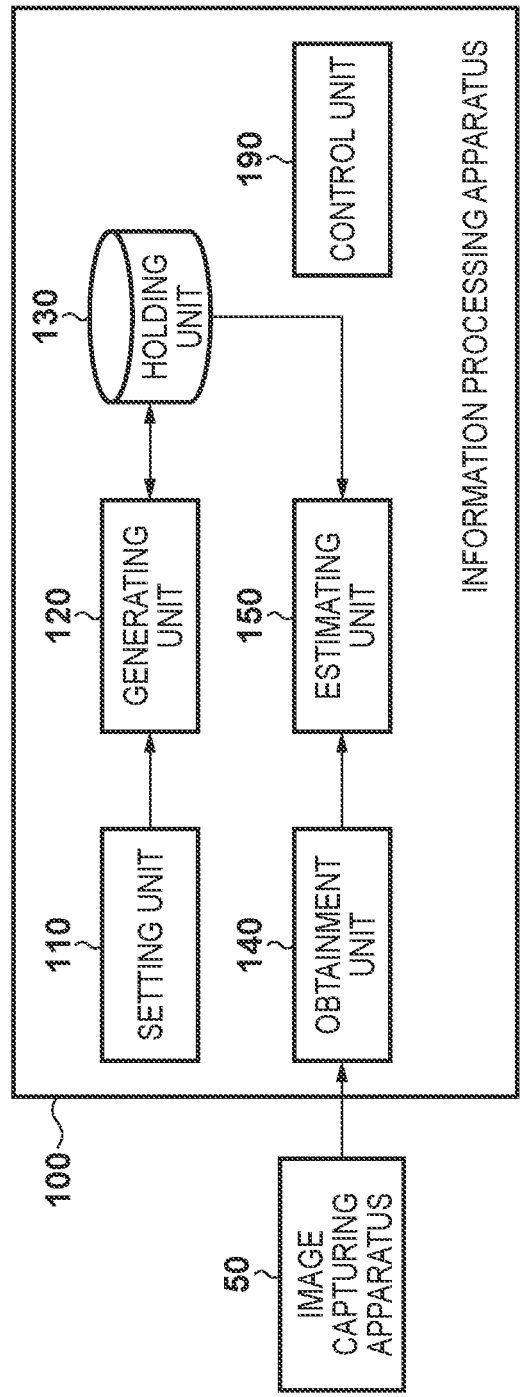
FIG. 2 is a block diagram illustrating an example of the functional configuration of a system.

Embodiments of the present invention will be described hereinafter with reference to the appended drawings. Note that the embodiments described hereinafter are merely specific examples of ways to carry out the present invention, and are specific embodiments of the configurations disclosed in the scope of patent claims.

First Embodiment

Overview

In the present embodiment, the position/orientation of a target object, which has a plurality of positions/orientations at which similar shapes are observed, is estimated using a grayscale image and a range image. The present embodiment assumes that the target object is a connector component 11, as illustrated in FIGS. 1A and 1B. With the connector component 11, a similar shape is observed when the position/orientation thereof is flipped between the front and rear and the top and bottom, and errors in the position/orientation estimation are therefore likely to occur.

According to the method disclosed in Japanese Patent No. 5716433, the positions/orientations in which similar shapes are observed are set as positions/orientations for verification during model fitting (verification positions/orientations). As illustrated in FIG. 1A, position/orientation candidates A-D, which serve as initial values for model fitting, are generated on the basis of an approximate value of the position/orientation of the connector component 11 recognized from an image 10 (an approximate position/orientation) and the verification positions/orientations. Reference models 12, which are three-dimensional shape models representing the overall shape of the connector component 11, are then aligned with the image 10, and the approximate positions/orientations of the position/orientation candidates A-D are updated. Finally, the position/orientation candidate for which the reference models 12 arranged on the approximate positions/orientations of the position/orientation candidates A-D and the image 10 matches to the highest degree (the position/orientation candidate B, in FIG. 1A) is selected as the estimated position/orientation. Here, "arranging the three-dimensional shape model" refers to projecting the three-dimensional shape model onto a two-dimensional image or a three-dimensional space, depending on the position/orientation. However, the process of alignment for each position/orientation candidate has a high processing cost.

Accordingly, the present embodiment reduces the processing cost by carrying out alignment using the geometric features, among geometric features of the reference models 12, of parts that are common among verification positions/orientations (common structures). The common structure of the connector component 11 illustrated in FIGS. 1A and 1B is the parallelepiped part excluding the pins, cutouts, and the like.

A method that reduces the processing cost by using the common structure will be described using FIG. 1B. First, a common structure model 13, which is a three-dimensional shape model of the common structure, is arranged over the approximate position/orientation of the connector component 11 recognized from the image 10, and is aligned through model fitting to update the approximate position/orientation. Then, the position/orientation candidates A-D are generated on the basis of the approximate position/orientation and verification positions/orientations, and the position/orientation candidate for which the reference models 12 and the image 10 match to the highest degree (the model fitting candidate B, in FIG. 1B) is selected as the estimated position/orientation. Using the common structure model in this manner makes it possible to carry out the alignment uniformly for each verification position/orientation, which in turn makes it possible to eliminate the part of aligning each of the position/orientation candidates and thereby reduce the processing cost.

Configuration

An example of the functional configuration of the system according to the present embodiment will be described next using the block diagram in FIG. 2. As illustrated in FIG. 2, the system according to the present embodiment includes an image capturing apparatus 50 and an information processing apparatus 100, and is configured such that the image capturing apparatus 50 and the information processing apparatus 100 are capable of data communication over a wireless and/or wired network. Although FIG. 2 illustrates the image capturing apparatus 50 and the information processing apparatus 100 as separate apparatuses, the image capturing apparatus 50 and the information processing apparatus 100 may have an integrated configuration.

First, the image capturing apparatus 50 will be described. The image capturing apparatus 50 includes a camera, which captures a grayscale image in which each pixel has a density value, and the range sensor, which captures a range image in which each pixel has a depth value. The image capturing apparatus 50 sends the grayscale image and the range image to the information processing apparatus 100.

The information processing apparatus 100 will be described next. A setting unit 110 sets a plurality of verification positions/orientations. A generating unit 120 generates a common structure model of the target object using a reference model, which is a three-dimensional shape model representing the overall three-dimensional shape of the target object and which is held in a holding unit 130, and the plurality of verification positions/orientations set by the setting unit 110. The generating unit 120 then registers the generated common structure model and the plurality of verification positions/orientations set by the setting unit 110 in the holding unit 130.

The holding unit 130 is memory that holds the reference model, various types of information required for processing (described later), and the like. An obtainment unit 140 obtains the grayscale image and the range image sent from the image capturing apparatus 50. An estimating unit 150 estimates the position/orientation of the target object on the basis of the common structure model and the reference model registered in the holding unit 130, and the grayscale image and the range image obtained from the image capturing apparatus 50 by the obtainment unit 140, and then outputs the estimated position/orientation. A control unit 190 controls the overall processing of the information processing apparatus 100.

The process through which the information processing apparatus 100 estimates the position/orientation of a target object in the images captured by the image capturing apparatus 50 (the grayscale image and the range image) will be described next with reference to FIG. 3, which is a flowchart illustrating that process.

Step S1100

The control unit 190 controls the information processing apparatus 100 so as to initialize the information processing apparatus 100. For example, under the control of the control unit 190, the generating unit 120 reads out the reference model registered in the holding unit 130, and the obtainment unit 140 obtains camera parameters from the image capturing apparatus 50 (a principal point position, a focal length, a distortion coefficient, the number of pixels, the resolution, and so on).

The reference model is information defining a collection of points, a collection of line segments connecting each of the points, and a collection of planes formed by pluralities of the line segments. FIGS. 4A to 4D are schematic diagrams illustrating the data structure of the reference model.

The shape of the reference model is defined by points P1 to P14, as illustrated in FIG. 4A, and line segments L1 to L16, each of which connects two of the points P1 to P14, as illustrated in FIG. 4B. FIG. 4C is a table containing an ID and three-dimensional coordinates (an x coordinate value, a y coordinate value, and a z coordinate value) for each of the points P1 to P14, and is included in the data of the reference model. For example, the three-dimensional coordinates of a point having an ID of P4 are (100, 200, 350). FIG. 4D is a table containing, for each of the line segments L1 to L16, an ID of that line segment, the IDs of the two points at the ends of the line segment, and an identifier indicating whether or not that line segment corresponds to a common structure, and is included in the data of the reference model. The identifier "true" indicates that the line segment corresponds to a common structure, whereas "false" indicates that the line segment does not correspond to a common structure (the following assumes that the initial value of the identifier is "false"). For example, the two points on both ends of the line segment having an ID of L4 are the point having an ID of P4 and the point having an ID of P5, and the identifier indicating whether or not that line segment corresponds to a common structure is "false" (i.e., the line segment does not correspond to a common structure). A common structure model corresponding to the reference model is defined by the identifiers registered in the table illustrated in FIG. 4D. Additionally, the reference model data includes a table that contains, for each plane constituting the reference model, an ID of that plane, the IDs of the points or line segments constituting the plane, and an identifier indicating whether or not that plane corresponds to a common structure.

The camera parameters are assumed to have been calibrated in advance according to the Zhang method (Z. Zhang, "A flexible new technique for camera calibration," IEEE Transactions on Pattern Analysis and Machine Intelligence, vol. 22, no. 11, pp. 1330-1334, 2000.), and are used during model fitting and when calculating the matching degree.

The control unit 190 sets the necessary parameters in the generating unit 120 and the estimating unit 150. For example, a nearby range (e.g., 1 mm) is set as the parameters necessary for the generating unit 120. A range that serves as a reference when associating image features with geometric features of the three-dimensional shape model, for example (e.g., 5 mm), are used as the parameters necessary for the estimating unit 150.

Step S1200

The setting unit 110 identifies the axes of symmetry of the reference model obtained in step S1100, and sets, as verification positions/orientations, transform parameters for rotating the orientation of the reference model 180 degrees about the identified axes of symmetry. Principal component analysis (PCA), which is a known technique, is used to identify the axes of symmetry of the reference model, for example. Specifically, a matrix in which the three-dimensional coordinates of the points constituting the reference model are arranged is analyzed through PCA, and primary component vectors corresponding to first to third primary components are taken as the axes of symmetry. As a result, verification positions/orientations corresponding to front/rear inversion, top/bottom inversion, and front/rear-top/bottom inversion, relative to the reference position/orientation, are set.

Step S1300

Using the reference model obtained in step S1100 and the plurality of verification positions/orientations set in step S1200, the generating unit 120 extracts, from the reference model, a geometric feature group common among the verification positions/orientations, and generates a common structure model corresponding to that reference model. The processing of step S1300 will be in detail described later.

Step S1400

The obtainment unit 140 obtains the grayscale image and the range image from the image capturing apparatus 50.

Step S1500

The estimating unit 150 estimates the position/orientation of the target object on the basis of the reference model obtained in step S1100, the common structure model generated in step S1300, and the grayscale image and range image obtained in step S1400, and outputs the estimated position/orientation. Note that the output destination of the estimated position/orientation is not limited to any specific output destination. The process carried out in the aforementioned step S1300 will be described in detail next with reference to the flowchart in FIG. 5.

Step S1301

The generating unit 120 sets a first position/orientation to serve as a reference for an Iterative Closest Point (ICP) algorithm used in step S1303.

The ICP (Iterative Closest Point) algorithm: P. J. Besl and N. D. McKay, "A method for registration of 3-D shapes," IEEE Transactions on Pattern Analysis and Machine Intelligence, vol. 14, no. 2, pp. 239-256, 1992.

In the present embodiment, and orientation in which each position component is 0, and a rotation matrix representing the orientation is a unit matrix, is set as the first position/orientation.

Step S1302

For each of the verification positions/orientations set in step S1200, the generating unit 120 generates a second position/orientation by transforming the first position/orientation using that verification position/orientation. The second position/orientation serves as the initial value for the ICP algorithm.

Step S1303

The generating unit 120 then updates each second position/orientation by using the ICP algorithm to align the reference model arranged at that second position/orientation with the reference model arranged at the first position/orientation. Note that in the present embodiment, the amount by which the position/orientation in the ICP algorithm is updated being substantially 0 is taken as convergence, and the process therefore moves to step S1304.

Step S1304

The generating unit 120 searches the vicinity of the geometric feature group of the reference model arranged at the first position/orientation, and extracts a geometric feature group that is common with the geometric feature group of the reference model arranged at the second position/orientation. Specifically, a single unselected geometric feature is selected from the reference model arranged at the first position/orientation, and if a geometric feature of the reference model arranged at one or more of the second positions/orientations is present within a nearby range from the selected geometric feature, the geometric features are determined to be common. This process is carried out for all of the geometric features in the reference model arranged at the first position/orientation. In the present embodiment, the common structure identifier of "true" is assigned to a geometric feature group, among the geometric feature groups of the reference model arranged at the first position/orientation, for which the geometric features of the reference models are arranged at all of the second positions/orientations are present within the nearby range. The process carried out in the aforementioned step S1500 will be described in detail next with reference to the flowchart in FIG. 6.

Step S1501

The estimating unit 150 detects two-dimensional edges as image features from the grayscale image obtained in step S1400. Note that a two-dimensional edge is a point where the density gradient is an extreme value. In the present embodiment, the two-dimensional edges are detected from the grayscale image using the Canny method (J. Canny, "A Computational Approach To Edge Detection," IEEE Transaction Pattern Analysis and Machine Intelligence, Vol. 8, no. 6, pp. 679-698, 1986).

Step S1502

The estimating unit 150 recognizes (calculates), from the grayscale image obtained in step S1400, the approximate position/orientation of the target object that corresponds to the initial value for the model fitting. For example, template images obtained by capturing the target object at a variety of orientations are created in advance, and the approximate position/orientation of the target object in the grayscale image is calculated by using template matching to match the template images to the grayscale image.

Step S1503

The estimating unit 150 associates the geometric features of the common structure model with the two-dimensional edges detected from the grayscale image and the three-dimensional coordinate points in the range image obtained in step S1400. The approximate position/orientation is then updated so that the residuals at the corresponding areas are a minimum. Here, distances in a two-dimensional image (the grayscale image) and spatial distances in a three-dimensional image (the range image) are at different scales, and thus if simultaneous equations are simply solved so that the residuals at the corresponding parts is a minimum, imbalance may arise in the percent contributions of the measurement information obtained from the grayscale image and the range image. As such, the present embodiment carries out alignment in accordance with the scale using optimization based on maximum likelihood estimation, as described in "K. Tateno, D. Kotake, and S. Uchiyama, 'A Model Fitting Method Using Intensity and Range Images for Bin-Picking Applications', The IEICE transactions on information and systems, J94-D(8), 1410-1422, 2011". Note that in the present embodiment, the amount by which the position/orientation in the model fitting is updated being substantially 0 is taken as convergence, and the process therefore moves to step S1504.

Step S1504

For each of the verification positions/orientations set in step S1200, the estimating unit 150 generates a position/orientation candidate by transforming the approximate position/orientation updated in step S1503 using that verification position/orientation. In other words, a position/orientation candidate subjected to front/rear inversion, top/bottom inversion, and front/rear-top/bottom inversion is obtained as a position/orientation based on the approximate position/orientation.

Step S1505

The estimating unit 150 judges the orientation on the basis of the degree to which the reference model arranged at the plurality of position/orientation candidates and the grayscale image match. Specifically, the geometric features of the reference model are associated with the two-dimensional edges detected in the grayscale image and the three-dimensional coordinate points in the range image. The average of the distances of the corresponding parts in the three-dimensional space is calculated as the degree to which the image and the reference model match, and the position/orientation candidate, among the plurality of position/orientation candidates, which has the highest matching degree, is selected as the result of estimating the position/orientation of the target object. At this time, it is necessary to calculate the distances of the corresponding areas for the image features detected from the grayscale image and the geometric features of the reference model as distances in the three-dimensional space. Accordingly, the average of the distances is calculated after converting the distances into values in the three-dimensional space using the camera parameters.

Thus according to the present embodiment, when estimating the position/orientation of the target object having positions/orientations at which similar shapes are observed, it is not necessary to carry out alignment for each of the position/orientation candidates, which makes it possible to reduce the processing cost.

Variations

The image capturing apparatus 50 is not limited to including the aforementioned camera, which captures the grayscale image, and range sensor, which captures the range image. For example, the image capturing apparatus 50 may include a camera that captures a color image rather than a grayscale image, or may include at least one of a camera that captures a two-dimensional image (a grayscale image, a color image, or the like) and a range sensor that captures a range image.

The holding unit 130 may be constituted by any memory device, such as a hard disk, a storage medium such as a CD or DVD, or storage located on a network.

Although the reference model and the common structure model represent a three-dimensional shape using a collection of points, a collection of line segments, and so on, the models are not limited thereto. For example, the reference model and the common structure model may be point set data obtained by uniformly sampling the planes and ridge lines of the target object, or may be data representing the surface shape as a collection of polygonal patches. The three-dimensional shapes of the reference model and the common structure model may be represented parametrically by a combination of implicit functions. Furthermore, the reference model and the common structure model may be represented with any format as long as the geometric features necessary for estimating the position/orientation are represented. In the data structure described above, the common structure model adds identifiers to the geometric features of the reference model, but the data structure is not limited thereto, as long as the common structures and parts aside from the common structures can be distinguished from each other. For example, weighting may be added instead of identifiers, and the reference model and common structure model may be held as separate models. If weighting is to be added, adding a higher weight to the common structure, for example, results in the alignment of step S1503 in FIG. 6 being carried out with higher priority given to the common structure parts, and thus the same effect as in the first embodiment is achieved. Additionally, the common structure model may be generated by an external apparatus and then obtained from the external apparatus over a network, from a storage medium, or the like.

The method for setting the verification position/orientation is not limited to the above-described method of rotating the orientation 180 degrees about a predetermined axis, and any method may be used as long as it is a method that sets the positions/orientations at which similar shapes are observed in accordance with the shape of the target object. For example, if the target object is generally a triangular prism, positions/orientations obtained by rotating the orientation 60 degrees about the axes of symmetry may be set. Additionally, the verification positions/orientations may be set by a user operating a graphical user interface (GUI), or verification positions/orientations set in advance may be loaded and set.

The method by which the generating unit 120 extracts the common geometric features is not limited to the above-described method using an ICP algorithm, and any method may be employed as long as the correspondence between the geometric features of reference models can be found. For example, a reference model may be rendered for each verification position/orientation, the rendered images may then be subjected to template matching, and parts with high degrees of similarity may then be extracted. Matching using a feature description method having high expressive power, such as a Signature of Histograms of OrienTations (SHOT) feature amount, may be employed as well. The method for determining whether or not geometric features are common need not focus only on whether or not geometric features are present nearby, and may be combined with another determination method. For example, a part where the degree to which normal lines match with geometric features within the nearby range match is greater than or equal to a threshold may be taken as a common geometric feature, or, if the geometric features have a curvature factor, a part where the degree to which the curvature factors of the geometric features within the nearby range match is greater than or equal to a threshold may be taken as a common geometric feature. Any other methods may be combined as well, as long as the methods determine whether or not the geometric features are similar.

The alignment of the three-dimensional shape model with the image by the estimating unit 150 is not limited to the above-described model fitting, and any method may be used as long as the target object is aligned using a three-dimensional shape model. For example, the alignment may be carried out through machine learning, or a two-dimensional image rendered from the three-dimensional shape model, an image holding depth information obtained from a depth buffer, or the like may be aligned with an image from the image capturing apparatus 50 using template matching. It is not necessary to use both the surface information and ridge line information of the target object in the alignment. Verification may be carried out using only the surface information of the object, or the alignment may be carried out using only the ridge line information.

The degree of matching used by the estimating unit 150 is not limited to the above-described average of the distances between the corresponding parts in the three-dimensional space, and any indicator may be used as long as it evaluates the degree of matching higher when the distances, shapes, or the like are closer between the image and the reference model. For example, the average of the residuals at the corresponding parts may be used, or the degree to which normal lines, curvature factors, or the like match may be evaluated. The similarity between the image from the image capturing apparatus 50 and a rendered image of the reference model may be evaluated as well.

In the first embodiment, the common structure model is generated by aligning the reference model arranged at the second position/orientation, with the reference model arranged at the first position/orientation. However, there are situations where a common structure model that has been generated must be revised. For example, if a new verification position/orientation has been added, the geometric feature common among the verification positions/orientations may change, in which case it is necessary to revise the common structure model. In such a case, the common structure model may be revised by replacing the reference model arranged at the first position/orientation, with a common structure model that has already been generated.

In the first embodiment, the estimating unit 150 judges the position/orientation of the target object from among a plurality of position/orientation candidates using the reference model after the alignment using the common structure model. However, a second stage of alignment processing, which uses the reference model, may be added. This may be added after step S1505, or after step S1504, for example. The alignment using the common structure model is uniform alignment for each of the verification positions/orientations, and thus the necessary processing cost for the overall process of estimating the position/orientation can be reduced.

Second Embodiment

The following embodiments and variations, including the present embodiment, will focus on the differences from the first embodiment, and items not mentioned explicitly in the following are assumed to be the same as in the first embodiment. The first embodiment described a method of generating a common structure model by aligning a reference model arranged on the basis of verification positions/orientations and then extracting a geometric feature group common among the verification positions/orientations. In the present embodiment, however, geometric features common among the verification positions/orientations are extracted by obtaining a grayscale image and a range image in which the target object is present and aligning the reference model through model fitting, in order to generate the common structure model.

Configuration

The obtainment unit 140 according to the present embodiment obtains the grayscale image and the range image, the correspondence of which is already known, from the image capturing apparatus 50. The generating unit 120 generates the common structure model on the basis of the verification positions/orientations set by the setting unit 110, the images obtained by the obtainment unit 140, and the reference model held in the holding unit 130.

The overall flow of the processing according to the present embodiment is basically the same as the processing sequence described in the first embodiment, and thus the following will describe procedures different from the first embodiment, using FIG. 3.

According to the present embodiment, in step S1300, geometric features common among the verification positions/orientations are extracted by aligning the reference model with the grayscale image and the range image. Accordingly, a process for obtaining the grayscale image and the range image from the image capturing apparatus 50 is carried out before the process of generating the common structure model. The process of generating the common structure model according to the present embodiment will be described next using FIG. 7, which is a flowchart illustrating that process.

Steps S2301-S2304

In steps S2301 to S2304, alignment is carried out by associating the geometric features of the reference model with the image features detected from the grayscale image and the three-dimensional coordinate points in the range image. Steps S2301, S2302, S2303, and S2304 are basically the same processes as the above-described steps S1501, S1502, S1504, and S1503, respectively, and will therefore not be described.

Step S2305

In step S2305, the generating unit 120 searches the vicinity of the geometric features associated with the image features, extracts the geometric features common among the verification positions/orientations, and adds the identifier "true", indicating the common structure. Specifically, a single unselected geometric feature is selected from among the geometric features associated with the image features. Here, the "geometric features associated with image features" refers to the geometric features of all reference models arranged on the basis of the position/orientation candidates. If geometric features of a reference model arranged on the basis of a different position/orientation candidate are present within a nearby range of the selected geometric features, those geometric features are determined to be common geometric features. This process is carried out for all of the geometric features associated with image features. In the present embodiment, if the geometric features of all the reference models arranged on the basis of the position/orientation candidates are present in the vicinity, the common structure identifier "true" is added to those geometric features.

Using the common structure model generated according to the present embodiment makes it unnecessary to carry out alignment for each of the position/orientation candidates when estimating the position/orientation of a target object having positions/orientations at which similar shapes are observed, which makes it possible to reduce the processing cost.

Variations

In the second embodiment, the common geometric feature group is extracted having determined whether or not the geometric features of another position/orientation candidate are present in the nearby range of the geometric features of the selected position/orientation candidate. However, the geometric features associated with the same image features may be used as the common geometric feature group.

Furthermore, in the second embodiment, an image including the target object is captured, the image is associated with a reference model, and a common geometric feature group is extracted, in order to generate the common structure model. However, similar association information is obtained in the position/orientation estimation process as well, and thus that association information may also be used to generate the common structure model.

Third Embodiment

The first and second embodiments described a method of generating a common structure model by extracting geometric features common among the verification positions/orientations. Incidentally, the common structure is often the dominant structure observed among the verification positions/orientations. In the connector component 11 illustrated in FIGS. 1A and 1B, the parallelepiped part excluding the pins, cutouts, and so on serves as the common structure, and thus omitting fine structures makes it possible to generate a common structure model in the same manner as in the first and second embodiments. Accordingly, in the present embodiment, the area of a surface constituting the reference model is calculated, whether or not that surface is a part corresponding to a fine structure is determined on the basis of the area, and a distinction is made between fine structure and structures aside from fine structures. The geometric features of parts aside from the parts representing fine structures are extracted, and the common structure model is generated. The generating unit 120 according to the present embodiment extracts the geometric features of parts aside from the parts representing fine structures from the reference model and generates the common structure model.

A processing sequence according to the present embodiment will be described next. Note, however, that the overall processing sequence according to the present embodiment is basically the same as in the first embodiment, and thus step S1100 and step S1300, which have different processes from the first embodiment, will be described here. Step S1100 and step S1300 will be described here as step S3100 and step S3300, respectively.

Step S3100

In step S3100, the control unit 190 controls the information processing apparatus 100 so as to initialize the information processing apparatus 100. In addition to the initialization according to the first embodiment, parameters are set for the generating unit 120, under the control of the control unit 190, for example. In the present embodiment, the common structure is extracted having determined whether or not the part has an area representing a fine structure, and thus a threshold is set for the area used in this determination (e.g., 200 mm square).

Step S3300

In step S3300, the generating unit 120 extracts the geometric features of the parts aside from the parts representing fine structures on the basis of the area of the surfaces constituting the reference model, and generates the common structure model. Specifically, first, an unselected surface is selected from the reference model. The area of the selected surface is then calculated. At this time, if the surface has a curvature factor, the area is calculated taking into account the curvature factor, on the basis of the surface area of a sphere corresponding to that curvature factor. The calculated area is compared with the threshold set in step S3100, and if the area is greater than the threshold, that surface is given a common structure identifier of "true". The above-described processing is carried out for all surfaces constituting the reference model.

Using the common structure model generated according to the present embodiment makes it unnecessary to carry out alignment for each of the position/orientation candidates when estimating the position/orientation of a target object having positions/orientations at which similar shapes are observed, which makes it possible to reduce the processing cost.

Variations

The method by which the generating unit 120 extracts the common geometric features is not limited to a determination based on the size of the surface area, and any method may be employed as long as it is a method that extracts geometric features from parts aside from parts representing fine structures. For example, the volumes of structures constituting the reference model may be calculated and geometric features of parts having large volumes may be extracted, or a normal line distribution of the structures may be analyzed and the geometric features of parts of little variation in the normal line distribution may be extracted. Furthermore, a low-resolution model may be generated by lowering the resolution of the reference model, and geometric features of parts aside from parts representing fine structures may be extracted from the difference between the reference model and the low-resolution model. In this case, the geometric features of the reference model and the geometric feature of the low-resolution model are associated with each other, and a geometric feature group of the reference model is extracted for parts in which the geometric features of the low-resolution model are present in the nearby range. Doing so makes it possible to generate a common structure model excluding parts representing fine structures, without changing the frequency. However, the low-resolution model may be a model whose resolution has been reduced through spatial filtering, or a hierarchical proximate mesh model based on a Level of Detail (LOD), neither of which affect the essence of the embodiment.

Fourth Embodiment

The present embodiment will describe a method in which a user operates a GUI to generate a common structure model through primitive shape model fitting and editing the three-dimensional shape model through user operations.

FIG. 8 is a diagram illustrating an example of a GUI for generating a common structure model according to the present embodiment. In the present embodiment, the GUI is displayed in a display device (not shown) connected to the information processing apparatus 100, and is operated by a user manipulating a user interface (a keyboard, a mouse, a touch panel, or the like; not shown) connected to the information processing apparatus 100. In the present embodiment, display control of the GUI and the processing carried out in response to the GUI being operated are both handled by the control unit 190.

A GUI 500 includes an execution panel 510, a model editing panel 520, a display switching panel 530, a parameter setting panel 540, a model display panel 550, a primitive shape selection panel 560, and a verification position/orientation confirmation panel 570.

The execution panel 510 includes a load reference model button, a fitting button, a generate common structure model button, and a save common structure model button. The model editing panel 520 includes an add part button and a remove part button. The display switching panel 530 includes a display reference model check box, a display common structure model check box, and a display primitive shape model check box. The parameter setting panel 540 includes a nearby range entry box.

The model display panel 550 displays the reference model 12, the common structure model 13, a primitive shape model 14, and model coordinate axes 20. Each three-dimensional shape model displayed in the model display panel 550 is switched between being displayed and hidden using the check boxes in the display switching panel 530. The model display panel 550 changes and displays the position/orientation of each three-dimensional shape model in response to the user manipulating the mouse or the like. For example, the user selects the three-dimensional shape model he/she wishes to edit using the left button on the mouse. The in-plane position of the three-dimensional shape model is changed by dragging with the left button of the mouse, the position of the three-dimensional shape model in the depth direction is changed with the mouse wheel, and the orientation of the three-dimensional shape model is changed by dragging with the right button of the mouse. The geometric features of the three-dimensional shape model can also be selected using the left button. The selected geometric feature is then subject to processing when the add part button and the remove part button (described later) are specified. Dragging a geometric feature of the primitive shape model 14 using the left button of the mouse makes it possible to deform the primitive shape model 14 while maintaining the original three-dimensional shape. The model coordinate axes 20 are the axes of symmetry of the reference model 12. The method for identifying the axes of symmetry is as described in the first embodiment, and will therefore not be described here. To generate the common structure model 13, the user deforms the primitive shape model 14 so as to overlap with the part of the reference model 12 that is likely to serve as the common structure. The user then confirms each shape by changing the orientation of the reference model 12, the generated common structure model 13, and the like.

The primitive shape selection panel 560 displays a thumbnail of a primitive shape model used when generating the common structure model. When the user operates the mouse to select the thumbnail of a primitive shape that is displayed, the primitive shape model corresponding to the thumbnail is loaded from the holding unit 130, and the primitive shape model 14 displayed in the model display panel 550 is changed. The user confirms the shape of the reference model 12 displayed in the model display panel 550, and selects the primitive shape model having a shape similar to the part to serve as the common structure.

The verification position/orientation confirmation panel 570 displays the verification position/orientation set using the reference model 12 as a thumbnail. When the user operates the mouse to select a thumbnail, using the left button of the mouse, for example, the orientations of the reference model 12 and the common structure model 13 are changed to the orientation of the selected thumbnail. The verification position/orientation confirmation panel 570 includes a set verification orientation button.

The aforementioned buttons will be described hereinafter. The load reference model button is a button for loading the reference model of the target object. A file selection dialog is displayed when the load reference model button is pressed, and when the user then operates the user interface to select the file of a desired reference model, the reference model written in the file is loaded from the holding unit 130. Once the reference model is loaded, the reference model 12 displayed in the model display panel 550 is overwritten by the newly-loaded reference model.

The fitting button is a button for fitting the primitive shape model 14 to the reference model 12. When the user operates the user interface and presses the fitting button, the coordinates of the vertexes constituting the primitive shape model 14 are overwritten with the coordinates of the vertexes constituting the reference model 12 present in the vicinity, and the shape of the primitive shape model 14 changes as a result.

The generate common structure model button is a button for generating the common structure model 13 by extracting, from the geometric feature group of the reference model 12, a geometric feature group of a part near which the geometric features of the primitive shape model 14 are present. This processing sequence is basically the same as in step S1304 according to the first embodiment, and will therefore not be described here. At this time, the values entered (specified) in the nearby range entry box of the parameter setting panel 540 are used for the nearby range.

The save common structure model button is a button for saving the common structure model 13, which has been generated through the series of operations, in the holding unit 130. When the user operates the user interface and presses the save common structure model button, a file save dialog is displayed, and when the user obtains a filename at the save destination, the common structure model 13 and the set verification position/orientation are saved in the holding unit 130. The method for saving the common structure model 13 is the same as in the first embodiment, and will therefore not be described here.

The add part button is a button for adding a geometric feature of the reference model 12 selected in the model display panel 550 to the common structure model 13. The remove part button is a button for removing a geometric feature of the common structure model 13 selected in the model display panel 550.

The display reference model check box, the display common structure model check box, and the display primitive shape model check box are check boxes for switching between displaying and hiding the corresponding three-dimensional shape models in the model display panel 550.

The nearby range entry box is an entry box for accepting a threshold for the nearby range used when extracting geometric features overlapping between the reference model and the primitive shape model during the common structure model generation. The user enters the threshold in the nearby range entry box by operating the user interface.

The set verification orientation button is a button for setting the positions/orientations at which similar shapes are observed, which are subject to judgment when estimating the position/orientation. When the user operates the user interface and presses the set verification orientation button, a GUI in a separate window is displayed (a verification position/orientation editing GUI), as illustrated in FIG. 9, and a plurality of verification positions/orientations can be set through user operations.

Figure 9:
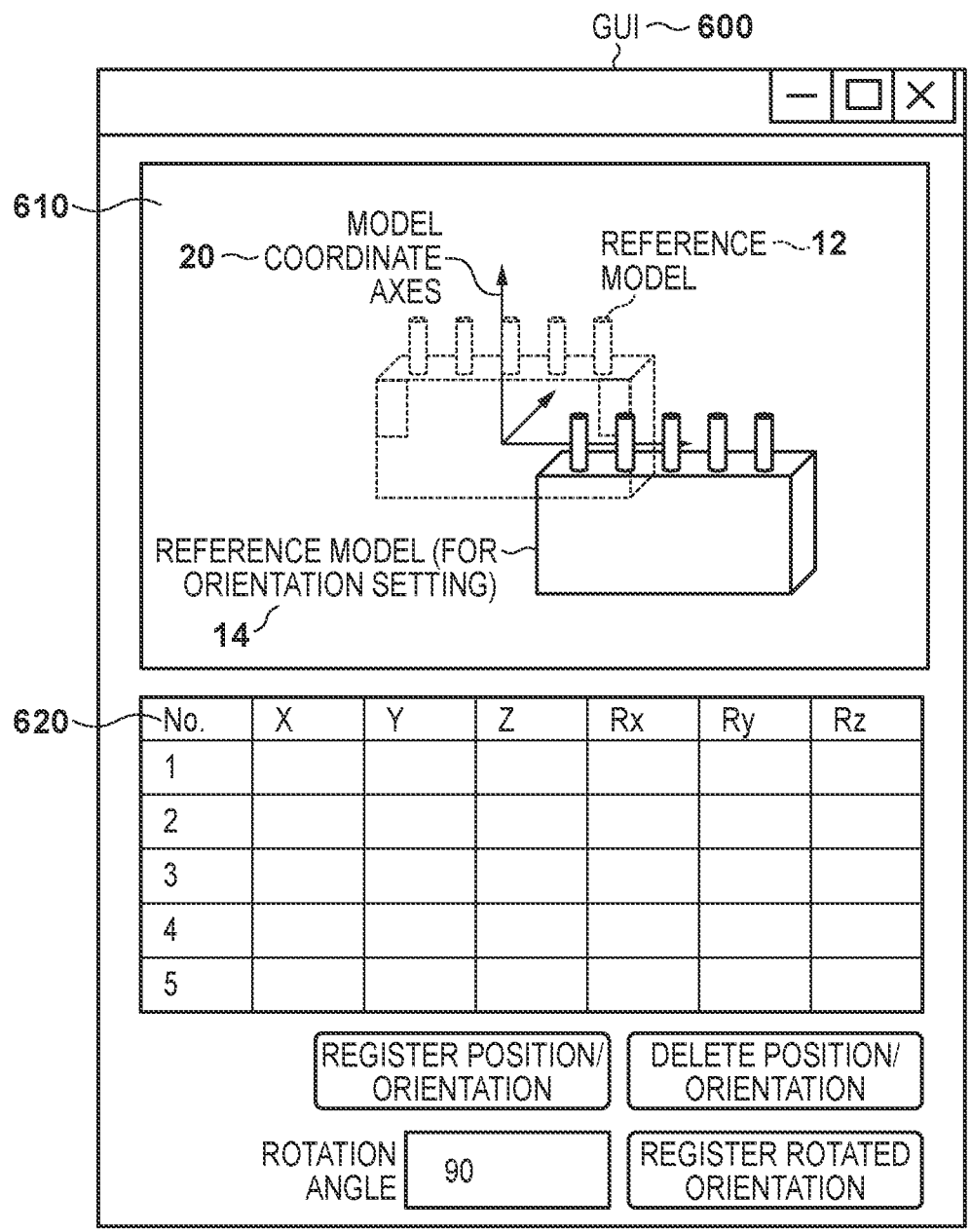
FIG. 9 is a diagram illustrating an example of a GUI in a separate window.

A verification position/orientation editing GUI 600, illustrated in FIG. 9, includes a model display panel 610 and a position/orientation editing panel 620. The GUI 600 also includes a register position/orientation button, a delete position/orientation button, a rotation angle entry box, and a register rotated orientation button. The verification position/orientation set through the GUI 600 is also reflected in the GUI 500 for generating the common structure model.

The model display panel 610 displays the reference model 12, a reference model (for orientation setting) 14, and model coordinate axes 20. The mouse operations made by the user are basically the same as those used for the model display panel 550, described above. Note that each axis in the model coordinate axes 20 can be selected by the user operating the mouse. The selected axis is then subject to the processing specified by the register rotated orientation button, which will be described later. The user changes the position/orientation of the reference model (for orientation setting) 14 while viewing the reference model 12 in order to set the verification position/orientation.

The position/orientation editing panel 620 displays positions/orientations registered by the user. A value entered by the user is displayed in each cell, and the user can edit the values displayed in the cells by operating the user interface. Additionally, when the user operates the mouse to select a registration number (the first column), the position/orientation of the reference model (for orientation setting) 14 is transformed to the position/orientation corresponding to the selected registration number.

The register position/orientation button is a button for registering the position/orientation of the reference model (for orientation setting) 14. When the user operates the user interface to press the register position/orientation button, the position/orientation of the reference model (for orientation setting) 14 at the point in time when the button was pressed is held. The position/orientation is also added to the position/orientation editing panel 620.

The delete position/orientation button is a button for deleting a position/orientation selected in the position/orientation editing panel 620. The rotation angle entry box is an entry box in which, by operating the user interface, the user enters a rotation angle used when setting an orientation rotated about predetermined axes at one time.

The register rotated orientation button is a button for holding a plurality of positions/orientations obtained by rotating the reference model (for orientation setting) 14 about the axis selected in the model display panel 610 on the basis of the value entered in the rotation angle entry box. A plurality of positions/orientations can be added at the same time in the position/orientation editing panel 620.

According to the present embodiment, the user can set the verification position/orientation, generate the common structure model, and the like by operating the GUI. Using the common structure model generated according to the present embodiment makes it unnecessary to carry out alignment for each of the position/orientation candidates when estimating the position/orientation of a target object having positions/orientations at which similar shapes are observed, which makes it possible to reduce the processing cost.

Variations

Verification positions/orientations determined for each of primitive shape models may be set as the verification positions/orientations. For example, if a quadrangular prism is selected as the primitive shape model, positions/orientations rotated by 90 degrees each about the axes of symmetry may be set as the verification positions/orientations, whereas if a triangular prism is selected, positions/orientations rotated by 60 degrees each about the axis of symmetry may be set as the verification positions/orientations. If the primitive shape model has been deformed, a position/orientation obtained by adjusting the verification position/orientation according to that shape may be set as the verification position/orientation.

The fourth embodiment describes a primitive shape model fitting method, in which the coordinates of the vertexes of the primitive shape model are revised to deform the shape, after which the fitting is carried out. However, the primitive shape model fitting method is not limited thereto. For example, the user may align the primitive shape model with the reference model using the deformed shape as-is, or the position/orientation may be aligned by loading primitive shape models having different sizes, which have been prepared in advance as templates. Any other method may be used as well, as long as it is a method that aligns a primitive shape model with the reference model.

Fifth Embodiment

Installing the information processing apparatus 100 described in the foregoing embodiments and variations in the hand part of an industrial robot arm, and using the information processing apparatus 100 to estimate the position/orientation of the target object and then grip the target object, can be given as an example of applying the information processing apparatus 100.

Figure 10:
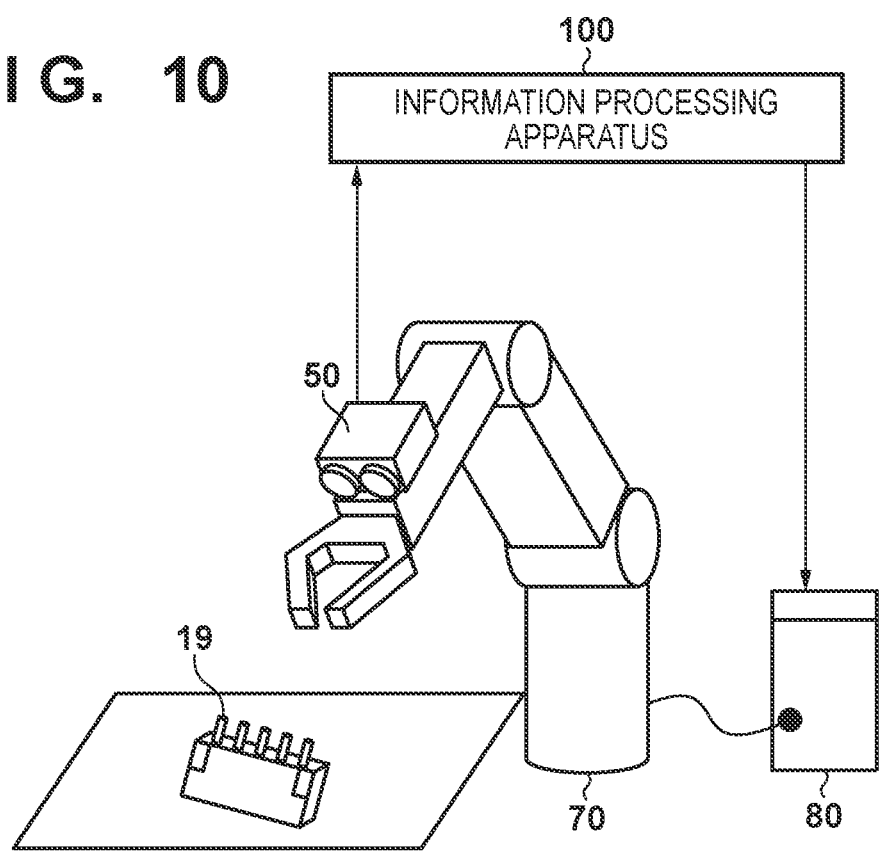
FIG. 10 is a diagram illustrating an example of the configuration of a robot system.

FIG. 10 is a diagram illustrating an example of the configuration of a robot system that grips a target object 19. The image capturing apparatus 50 is installed in the hand part of a robot 70. The image capturing apparatus 50 captures a grayscale image and a range image of the target object 19, and outputs the captured grayscale image and range image to the information processing apparatus 100. The information processing apparatus 100 (the estimating unit 150) estimates the position/orientation of the target object 19 using the grayscale image and range image input from the image capturing apparatus 50, and the common structure model and reference model obtained from the holding unit 130, and then outputs the estimated position/orientation to a robot controller 80. On the basis of the position/orientation output from the information processing apparatus 100 (the estimating unit 150), the robot controller 80 moves the hand of the robot 70 so as to grip and attach the target object 19 in that position/orientation.

The processing sequence carried out by the information processing apparatus 100 according to the present embodiment is the same as the processing sequence described in the first embodiment, and will therefore not be described here. Note that it is assumed that the relative positions/orientations of the hand of the robot 70 and the image capturing apparatus 50 have been calibrated in advance using, for example, the method of Horaud et al (R. Horaud and F. Dornaika, "Hand-Eye Calibration," International Journal of Robotics Research, vol. 14, no. 3, pp. 195-210, 1995).

Using the information processing apparatus 100 according to the present embodiment, a robot system can grip a target object, which has positions/orientations at which similar shapes are observed, having reduced the processing cost for estimating the position/orientation of the target object.

Sixth Embodiment

In the foregoing embodiments, fixed thresholds for the nearby range, the area of services, and the like, which have been set in advance, are used to determine whether or not geometric features of the reference model are geometric features common among the verification position/orientations when generating the common structure model. However, the geometric features necessary during verification using the common structure model may vary if the image resolution is different. For example, in the case of a high-resolution range image holding depth information, the three-dimensional coordinates obtained by measuring the surfaces of the target object are highly accurate, and it is easy to detect even small steps. When the geometric features of a part representing such small steps are not geometric features common among the verification positions/orientations, the geometric features of that part may be included in the common structure model if the nearby range is not set correctly. On the other hand, in the case of a low-resolution range image, the three-dimensional coordinates obtained by measuring the surfaces of the target object have a low accuracy, and it is therefore necessary to generate the common structure model having set a wider nearby range so as to allow for error in the accuracy of the three-dimensional coordinates.

In the present embodiment, the nearby range is set to a narrower range when the image (the grayscale image or the range image) has a high resolution in order to generate a more accurate common structure model, and is set to a wider range when the image has a low resolution in order to allow for error in the accuracy of the three-dimensional coordinates of the range image. "High resolution" refers to a resolution greater than or equal to a threshold, whereas "low resolution" refers to a resolution less than the threshold, for example.

The information processing apparatus according to the present embodiment adds a parameter determination unit to the configuration illustrated in FIG. 2. The parameter determination unit determines the threshold used by the generating unit 120 in accordance with the resolution of the image obtained from the image capturing apparatus 50. The determined threshold is input to the generating unit 120.

The generating unit 120 generates the common structure model in the same manner as in the first embodiment, on the basis of the verification positions/orientations obtained from the setting unit 110 and the reference model obtained from the holding unit 130. However, here, a threshold input from the parameter determination unit is used when determining the nearby range.

The flow of the overall processing according to the present embodiment is basically the same as the processing sequence described in the first embodiment, and thus processes different from those in the first embodiment will be described using FIG. 3. In the present embodiment, the nearby range used in the process for generating the common structure model (step S1300) is determined in accordance with the resolution obtained from the image capturing apparatus 50, and thus a parameter determination process is carried out before the process for generating the common structure model. The threshold obtained from the parameter determination unit as described above is used to determine the nearby range in step S1304 of the common structure model generation process. Specifically, when the resolution of the image obtained from the image capturing apparatus 50 in the initialization process (step S1100) is represented by x and a coefficient for adjusting the nearby range with the image resolution is represented by a, a nearby range k is calculated according to the following formula.

$$k=a/x$$

According to the present embodiment, changing the accuracy of the common structure model in accordance with the image resolution in this manner makes it possible to carry out alignment suited to the image resolution. Note that the above formula for calculating the nearby range k on the basis of the resolution of the image obtained from the image capturing apparatus 50 is merely an example, and many variations are conceivable.

Variations

The threshold determined by the parameter determination unit is not limited to the above-described nearby range. For example, if the degree of matching of normal lines, curvature factors, or the like of the geometric features is combined in the determination as to whether or not the geometric features are common, thresholds thereof may be determined in accordance with the resolution. In this case, the calculation formula may be designed so that when the image has a high resolution, for example, the threshold for the degree of matching is set lower in order to extract geometric features representing more similar shapes, and is set higher when such is not the case.

Seventh Embodiment

In the foregoing embodiments, the approximate position/orientation is calculated by aligning the common structure model with the target object in the image, and the estimated position/orientation is then calculated by judging the position/orientation from among the verification positions/orientations using the reference model. However, it is less likely that the position/orientation will be estimated erroneously when the image has a high resolution, even if the component has positions/orientations at which similar shapes are observed.

Accordingly, in the present embodiment, it is determined whether or not it is necessary to judge the position/orientation on the basis of the verification positions/orientations in accordance with the image resolution, and the content of the processing carried out when estimating the position/orientation is switched on the basis of the result of that determination. Specifically, if the image has a low resolution, the position/orientation is judged on the basis of the verification positions/orientations in the position/orientation estimation process, whereas if the image has a high resolution, the position/orientation is not judged.

The information processing apparatus according to the present embodiment adds a mode determination unit to the configuration illustrated in FIG. 2. The mode determination unit carries out a mode determination process for determining, in accordance with the resolution of the image obtained from the image capturing apparatus 50, whether or not it is necessary for the estimating unit 150 to judge the position/orientation on the basis of the verification positions/orientations. The details of the determination are input to the estimating unit 150.

The flow of the overall processing according to the present embodiment is basically the same as the processing sequence described in the first embodiment, and thus processes different from those in the first embodiment will be described using FIG. 3. In the present embodiment, the details of the position/orientation estimation process (step S1500) are switched in accordance with the resolution obtained from the image capturing apparatus 50, and thus the mode determination process is carried out before the position/orientation estimation process. If it is determined, as a result of the mode determination process, that it is necessary to judge the position/orientation on the basis of the verification positions/orientations, the same position/orientation estimation process as that of the first embodiment is carried out. On the other hand, if it is determined that the position/orientation judgment is not necessary, the model fitting process of steps S1501 to S1503 is carried out using the reference model, after which the position/orientation estimation process ends.

Thus according to the present embodiment, switching the verification method in accordance with the image resolution makes it possible to reduce the processing cost when estimating the position/orientation of a target object having positions/orientations at which similar shapes are observed.

Eighth Embodiment

The function units of the information processing apparatus 100 illustrated in FIG. 2 may be realized by hardware, or the function units aside from the holding unit 130 may be realized by software (computer programs). In the latter case, a computer apparatus capable of executing the computer programs can be applied as the information processing apparatus 100. An example of the hardware configuration of a computer apparatus that can be applied as the information processing apparatus 100 will be described with reference to the block diagram in FIG. 11.

A CPU 1101 executes various types of processes using computer programs, data, and the like stored in RAM 1102, ROM 1103, and the like. As a result, the CPU 1101 controls the operations of the computer apparatus as a whole, and executes or controls the above-described processes carried out by the information processing apparatus 100.

The RAM 1102 has an area for storing computer programs, data, and the like loaded from ROM 1103 or an external storage device 1106, data received from the exterior (e.g., from the image capturing apparatus 50) via an I/F 1107, and the like. The RAM 1102 further has a work area used by the CPU 1101 when executing various processes. In this manner, the RAM 1102 can provide various types of areas as appropriate. Information that does not need to be overwritten, such as configuration data and a boot program of the computer apparatus, is stored in the ROM 1103.

An operation unit 1104 is constituted by a user interface such as a mouse, a keyboard, a touch panel, or the like, and can input various types of instructions to the CPU 1101 be being operated by a user. For example, the user operates the operation unit 1104 to make input operations in the above-described GUI.

A display unit 1105 is constituted by a liquid crystal screen, a touch panel, or the like, and is capable of displaying the results of processes performed by the CPU 1101 as images, text, or the like. For example, the above-described GUI is displayed in the display unit 1105.

The external storage device 1106 is a high-capacity information storage device such as a hard disk drive device. An operating system (OS), computer programs for causing the CPU 1101 to execute or control the above-described processes carried out by the information processing apparatus 100, data, and the like are stored in the external storage device 1106. The computer programs stored in the external storage device 1106 include computer programs for causing the CPU 1101 to realize functions corresponding to the function units of the information processing apparatus 100 illustrated in FIG. 2, with the exception of the holding unit 130. The data stored in the external storage device 1106 also includes information (thresholds and the like) handled as a known information in the descriptions given above. Various other types of information described above as being stored in the holding unit 130 may also be stored in the external storage device 1106.

The computer programs, data, and the like stored in the external storage device 1106 are loaded into the RAM 1102 as appropriate under the control of the CPU 1101, and are then processed by the CPU 1101.

The I/F 1107 functions as an interface for carrying out data communication with external devices, and for example, the computer apparatus carries out data communication with the image capturing apparatus 50 via the I/F 1107.

Figure 11:
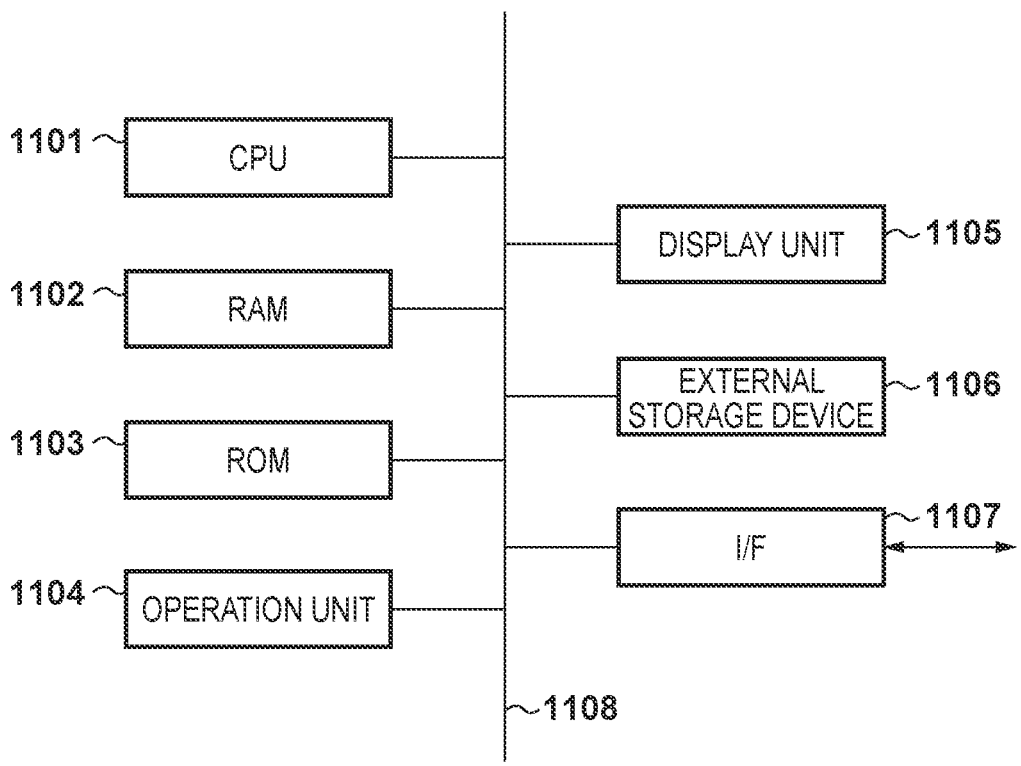
FIG. 11 is a block diagram illustrating an example of the hardware configuration of a computer apparatus.

The CPU 1101, RAM 1102, ROM 1103, operation unit 1104, display unit 1105, external storage device 1106, and I/F 1107 are all connected to a bus 1108. Note that the configuration illustrated in FIG. 11 is merely one example of the hardware configuration of a computer apparatus that can be applied as the information processing apparatus 100.

Note that some or all of the embodiments and variations described above may be used in appropriate combinations with each other. Additionally, some or all of the embodiments and variations described above may be used selectively.

Summary of Effects

According to the first to third embodiments, using the common structure model generated according to the embodiments makes it unnecessary to carry out alignment for each of the plurality of position/orientation candidates when estimating the position/orientation of a target object having positions/orientations at which similar shapes are observed, which makes it possible to reduce the processing cost.

According to the fourth embodiment, a user can set the verification position/orientation, generate the common structure model, and the like by operating the GUI. According to the fifth embodiment, using the above-described information processing apparatus, a robot system can estimate the position/orientation of the target object having positions/orientations at which similar shapes are observed, and a robot can then grip the target object.

According to the sixth embodiment, changing the accuracy of the common structure model in accordance with the image resolution makes it possible to carry out alignment suited to the image resolution. According to the seventh embodiment, switching the verification method in accordance with the image resolution makes it possible to reduce the processing cost when estimating the position/orientation of a target object having positions/orientations at which similar shapes are observed.

Summary of Definitions

The above-describes setting unit 110 may be any unit that sets the positions/orientations of a target object at which similar shapes are observed as verification positions/orientations. For example, a verification position/orientation that has been set in advance may be set, or the axes of symmetry of a reference model may be identified and the position/orientation may be set by rotating the orientation about the axes of symmetry. Additionally, a set verification position/orientation may be set as a three-dimensional shape model (e.g., a primitive shape model) associated with the reference model. Furthermore, the user may make the setting while changing the orientation of the reference model displayed in the GUI and confirming the shape.

The generating unit 120 may be any unit that extracts a geometric feature group common among the verification positions/orientations. For example, reference models arranged at the plurality of second positions/orientations generated on the basis of the verification positions/orientations may be aligned with the reference model arranged at the first position/orientation. Then, a geometric feature group for which the geometric feature group of the reference models arranged at the second positions/orientations are present nearby may be extracted from the geometric feature group of the reference model arranged at the first position/orientation. Additionally, a reference model arranged according to the position/orientation candidate generated on the basis of a verification position/orientation may be aligned with an image including the target object, and a geometric feature group for which a geometric feature group of a different position/orientation candidate is present within a nearby range may be extracted from geometric feature groups associated with the image. A geometric feature group of a part aside from a part representing a fine structure may also be extracted from the reference model. Furthermore, the user may select a geometric feature group common among the verification positions/orientations with the mouse or the like and extract that geometric feature group while changing the orientation of the reference model displayed in the GUI and confirming the shape.

The holding unit 130 may be any storage device that holds the reference model and the common structure model. For example, the holding unit 130 may be a hard disk, a CD or DVD, or storage located on a network. Additionally, the method for representing the shapes of the reference model and the common structure model may be any method capable of representing the three-dimensional shape of the target object. For example, line segments, surfaces, and the like may be represented by the relationships among points, or point group data obtained by uniformly sampling surfaces and ridge lines may be used. Alternatively, polygon data representing the surface shape as a collection of polygonal patches may be used, or the surface shape may be represented parametrically using a combination of implicit functions. The common structure model may have any data structure as long as the common structure can be distinguished from parts aside from the common structure. For example, identifiers, weighting, or the like may be added to the geometric features of the reference model, and the reference model and common structure model may be held as separate pieces of data.

The obtainment unit 140 may be any unit that inputs an image including the target object, captured by an image capturing apparatus, to the information processing apparatus. The input image may be, for example, a grayscale image, a color image, a range image in which each pixel has depth information, or the like. Additionally, a plurality of types of these images may be input.

The estimating unit 150 may be any unit that estimates the position/orientation of the target object by verifying the common structure model and the reference model against an image including the target object. For example, the common structure model may be aligned with the image, and the orientation of the target object may then be judged from the verification positions/orientations, using the reference model. Additionally, alignment may be carried out with the reference model after the aforementioned orientation judgment. Alternatively, the common structure model may be aligned with the image, and the orientation judgment may then be carried out after aligning the reference model with the image. Furthermore, the alignment method may be any method that estimates the position/orientation of a target object included in an image using a three-dimensional shape model. For example, the estimation may be carried out using model fitting, template matching, machine learning, or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-151962, filed Aug. 10, 2018, which is hereby incorporated by reference herein in its entirety.

What is claimed is:

1. An information processing apparatus comprising:
one or more processors programmed to cause the information processing apparatus to function as:
a setting unit configured to set matching positions/orientations of respective models with a shape similar to that of a target object;
a generating unit configured to generate a common structure model including geometric features of parts, among geometric features of a reference model representing a three-dimensional shape of the target object, that is common among the models that the setting unit sets the matching positions/orientations;
an obtaining unit configured to obtain an image including the target object; and
an estimating unit configured to estimate a position/orientation of the target object by matching the image with the reference model which is arranged by using the matching positions/orientations and a position/orientation of a part of the target object estimated based on the image and the common structure model.

2. The information processing apparatus according to claim 1,
wherein the estimating unit calculates an approximate position/orientation of the target object by aligning an image feature detected from the image with the common structure model, and judges the position/orientation of the target object on the basis of the approximate position/orientation, the candidates, and the reference model, or judges the position/orientation of the target object after aligning the reference model with the image feature.

3. The information processing apparatus according to claim 1,
wherein the generating unit aligns the reference model arranged at a first position/orientation with the reference model arranged at a second position/orientation generated on the basis of the candidates, and extracts, from a geometric feature group of the reference model arranged at the first position/orientation, a geometric feature group of a part near which a geometric feature group of the reference model arranged at the second position/orientation is present.

4. The information processing apparatus according to claim 1,
wherein the generating unit aligns each of the reference models arranged at two or more positions/orientations generated on the basis of the candidates with an image feature detected from the image, and extracts, from a geometric feature group associated with the image feature, a geometric feature group of a part near which a geometric feature group of the reference models arranged at one or more different positions/orientations is present.

5. The information processing apparatus according to claim 1, wherein of the geometric features of the reference model, the generating unit extracts a geometric feature aside from a part representing a fine structure of a shape.

6. The information processing apparatus according to claim 1, wherein the one or more processors are further programmed to cause the information processing apparatus to function as:
a display control unit configured to cause the reference model and the common structure model to be displayed.

7. The information processing apparatus according to claim 6, wherein the one or more processors are further programmed to cause the information processing apparatus to function as:
an accepting unit configured to accept a user operation, wherein the display control unit arranges and displays the reference model on the basis of the candidates in response to the user operation.

8. The information processing apparatus according to claim 7,
wherein the accepting unit accepts a threshold designating a nearby range used when determining whether or not, among a geometric feature group of the reference model arranged at the first position/orientation, a geometric feature group of the reference model arranged at the second position/orientation generated on the basis of the candidates is present in the vicinity, and a threshold for determining whether or not a geometric feature of the reference model indicates a part representing a fine structure.

9. The information processing apparatus according to claim 3, wherein the one or more processors are further programmed to cause the information processing apparatus to function as:
a first determination unit configured to determine, on the basis of a resolution of the image, a threshold designating a nearby range used when determining whether or not, among a geometric feature group of the reference model arranged at the first position/orientation, a geometric feature group of the reference model arranged at the second position/orientation generated on the basis of the candidates is present in the vicinity, and a threshold for determining whether or not a geometric feature of the reference model indicates a part representing a fine structure.

10. The information processing apparatus according to claim 9, wherein the one or more processors are further programmed to cause the information processing apparatus to function as:
a second determination unit configured to determine, on the basis of a resolution of the image, whether or not the estimating unit verifies using the common structure model.

11. An information processing method carried out by an information processing apparatus, the method comprising:
setting matching positions/orientations of respective models with a shape similar to that of a target object;
generating a common structure model including geometric features of parts, among geometric features of a reference model representing a three-dimensional shape of the target object, that is common among the models that the setting unit sets the matching positions/orientations;
obtaining an image including the target object; and
estimating a position/orientation of the target object by matching the image with the reference model which is arranged by using at the matching positions/orientations and a position/orientation of a part of the target object estimated based on the image and the common structure model.

12. A robot system comprising:
an image capturing apparatus that captures an image;
an information processing apparatus including:
one or more processors programmed to cause the information processing apparatus to function as:
a setting unit configured to set matching positions/orientations of respective models with a shape similar to that of a target object;
a generating unit configured to generate a common structure model including geometric features of parts, among geometric features of a reference model representing a three-dimensional shape of the target object, that is common among the models that the setting unit sets the matching positions/orientations;
an obtaining unit configured to obtain an image including the target object; and
an estimating unit configured to estimate a position/orientation of the target object by matching the image with the reference model which is arranged by using the matching positions/orientations and a position/orientation of a part of the target object estimated based on the image and the common structure model; and
a robot that grips the target object on the basis of an estimation result of the position/orientation of the target object obtained by the information processing apparatus.

13. A non-transitory computer-readable storage medium storing a computer program for causing a computer to function as:
a setting unit configured to set positions/orientations of respective models with a shape similar to that of a target object;
a generating unit configured to generate a common structure model including geometric feature of parts, among geometric features of a reference model representing a three-dimensional shape of the target object, that is common among the models that the setting unit sets the matching positions/orientations;
an obtaining unit configured to obtain an image including the target object; and
an estimating unit configured to estimate a position/orientation of the target object by matching the image with the reference model which is arranged by using the matching positions/orientations and a position/orientation of a part of the target object estimated based on the image and the common structure model.

* * * * *